(12) United States Patent
Caldwell et al.

(10) Patent No.: US 10,862,760 B2
(45) Date of Patent: Dec. 8, 2020

(54) NETWORK FUNCTIONS VIRTUALIZATION

(71) Applicant: Metaswitch Networks Ltd., Enfield (GB)

(72) Inventors: Andrew Munro Caldwell, Enfield (GB); Benjamin Gill, Enfield (GB); Christopher Swindle, Enfield (GB); Christopher Coomber, Enfield (GB); Murray Rogers, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/396,437

(22) Filed: Apr. 26, 2019

(65) Prior Publication Data
US 2019/0334781 A1    Oct. 31, 2019

(30) Foreign Application Priority Data

Apr. 26, 2018  (GB) .................................. 1806864.3

(51) Int. Cl.
*G06F 15/173* (2006.01)
*H04L 12/24* (2006.01)
*G06F 9/455* (2018.01)

(52) U.S. Cl.
CPC .......... *H04L 41/12* (2013.01); *G06F 9/45558* (2013.01); *G06F 2009/4557* (2013.01); *G06F 2009/45595* (2013.01)

(58) Field of Classification Search
CPC ................ H04L 41/12; G06F 9/45558; G06F 2009/45595; G06F 2009/4557; G06F 2009/45562

(Continued)

(56) References Cited

U.S. PATENT DOCUMENTS

| 7,464,383 B1 * | 12/2008 | Dow ...................... G06F 9/4488 |
| | | 719/316 |
| 2014/0181939 A1 * | 6/2014 | Bonnell .................. H04L 63/08 |
| | | 726/7 |

(Continued)

FOREIGN PATENT DOCUMENTS

| EP | 3285439 A1 | 2/2018 |
| EP | 3313023 A1 | 4/2018 |

(Continued)

OTHER PUBLICATIONS

Combined Search and Examination Report dated Jun. 19, 2018 for GB Application No. GB 1806864.3.

(Continued)

*Primary Examiner* — Thuong Nguyen
(74) *Attorney, Agent, or Firm* — EIP US LLP

(57) ABSTRACT

Embodiments relate to virtualization and have particular application to lifecycle management of Virtualized Network Functions (VNFs). Preferred embodiments provide a method for managing VNFs in a communications network that comprises management and orchestration (MANO) entities and a deployment management entity which is functionally separate from the MANO entities. The method comprises, at the deployment management entity: receiving a lifecycle management message relating to a deployment of VNFs; associating the received lifecycle management message with a specific deployment of VNF instances, the specific deployment comprising a set of more than one VNF instances orchestrated by a network function virtualization (NFV) orchestrator and managed by a VNF management entity, both of which are said MANO entities; updating a first VNF instance in the deployment on the basis of the received lifecycle management message; and updating a (Continued)

second VNF instance in the deployment on the basis of the received lifecycle management message.

14 Claims, 9 Drawing Sheets

(58) Field of Classification Search
USPC ......................................................... 709/223
See application file for complete search history.

(56) References Cited

U.S. PATENT DOCUMENTS

| | | | | |
|---|---|---|---|---|
| 2016/0103698 | A1* | 4/2016 | Yang | G06F 9/5022 714/4.11 |
| 2016/0150116 | A1* | 5/2016 | Watariuchi | G06F 3/1204 358/1.15 |
| 2016/0363623 | A1* | 12/2016 | Chandra | G01R 31/2837 |
| 2017/0041409 | A1* | 2/2017 | Chen | H04L 67/18 |
| 2017/0257276 | A1* | 9/2017 | Chou | H04L 41/0823 |
| 2017/0324612 | A1* | 11/2017 | Perez | H04L 41/0893 |
| 2018/0004576 | A1* | 1/2018 | Gokurakuji | G06F 9/4868 |
| 2018/0018244 | A1* | 1/2018 | Yoshimura | G06F 13/00 |
| 2018/0034781 | A1* | 2/2018 | Jaeger | H04L 63/20 |
| 2018/0052701 | A1* | 2/2018 | Kaplan | G06F 9/45558 |
| 2018/0309646 | A1* | 10/2018 | Mustafiz | H04L 41/0886 |
| 2019/0052528 | A1* | 2/2019 | Yoshimura | H04L 41/0896 |
| 2019/0065234 | A1* | 2/2019 | Zembutsu | H04L 47/82 |
| 2019/0089780 | A1* | 3/2019 | Yousaf | H04L 41/20 |
| 2019/0141785 | A1* | 5/2019 | Chou | H04W 8/08 |
| 2019/0222611 | A1* | 7/2019 | Lin | G06F 9/45558 |
| 2019/0260690 | A1* | 8/2019 | Sun | H04L 47/20 |
| 2019/0327621 | A1* | 10/2019 | Chou | H04L 41/0896 |
| 2019/0334781 | A1* | 10/2019 | Caldwell | G06F 9/45558 |
| 2019/0363924 | A1* | 11/2019 | Tse | H04L 41/0806 |
| 2020/0014584 | A1* | 1/2020 | Rauschenbach | H04L 41/0609 |
| 2020/0044919 | A1* | 2/2020 | Yao | H04L 41/0806 |

FOREIGN PATENT DOCUMENTS

| | | |
|---|---|---|
| EP | 3326324 A1 | 5/2018 |
| WO | 2017157708 A1 | 9/2017 |

OTHER PUBLICATIONS

Mo et al.: "NFV Reliability using COTS Hardware draft-mlk-nfvrg-nfv-reliability-using-cots-01", Oct. 17, 2015, https://tools.ietf.org/html/draft-mlk-nfvrg-nfv-reliability-using-cots-01.

Verizon: Verizon Network Infrastructure Planning, "SDN-NFV Reference Architecture", Version 1.0, Feb. 2016, https://vault.netvoyage.com/neWeb2/searchRes.aspx?newSearch=E&q==999(4845-1664-8341)&open=1.

Zong et al.: "Virtualized Network Function (VNF) Pool BoF", https://www.ietf.org/proceedings/89/slides/slides-89-vnfpool-0.pdf.

Bernini et al.: "VNF Pool Orchestration for Automated Resiliency in Service Chains draft-bernini-nfvrg-vnf-orchestration-02", Apr. 3, 2016, https://tools.ietf.org/html/draft-bernini-nfvrg-vnf-orchestration-02.

Dreibholz et al.: "The Applicability of Reliable Server Pooling (RSerPool) for Virtual Network Function Resource Pooling (VNFPOOL) draft-dreibholz-vnfpool-rserpool-applic-06.txt", Aug. 21, 2017, https://tools.ietf.org/html/draft-dreibholz-vnfpool-rserpool-applic-06#ref-12.

Deshpande, Smita: "DevOps for operators in an era of digital services", http://cloudblog.ericsson.com/digital-services/devops-for-operators-in-an-era-of-digital-services.

Deng et al., ONS "The Modeling interplay between Standards & Open Source NFV Orchestrator", Apr. 3-6, 2017, Santa Clara, http://events.linuxfoundation.org/sites/events/files/slides/ONS_2017_PPT%20Modelling%20Interplay-v%206.pdf.

ETSI NFV IFA011 V2.1.1, (Oct. 2016), Network Functions Virtualisation (NFV); Management and Orchestration; VNF Packaging Specification, https://www.etsi.org/deliver/etsi_gs/NFV-IFA/001_099/011/02.01.01_60/gs_NFV-IFA011v020101p.pdf.

OASIS, "TOSCA Simple Profile for Network Functions Virtualization (NFV) Version 1.0", Committee Specification Draft 04, May 11, 2017, http://docs.oasis-open.org/tosca/tosca-nfv/v1.0/tosca-nfv-v1.0.html.

* cited by examiner

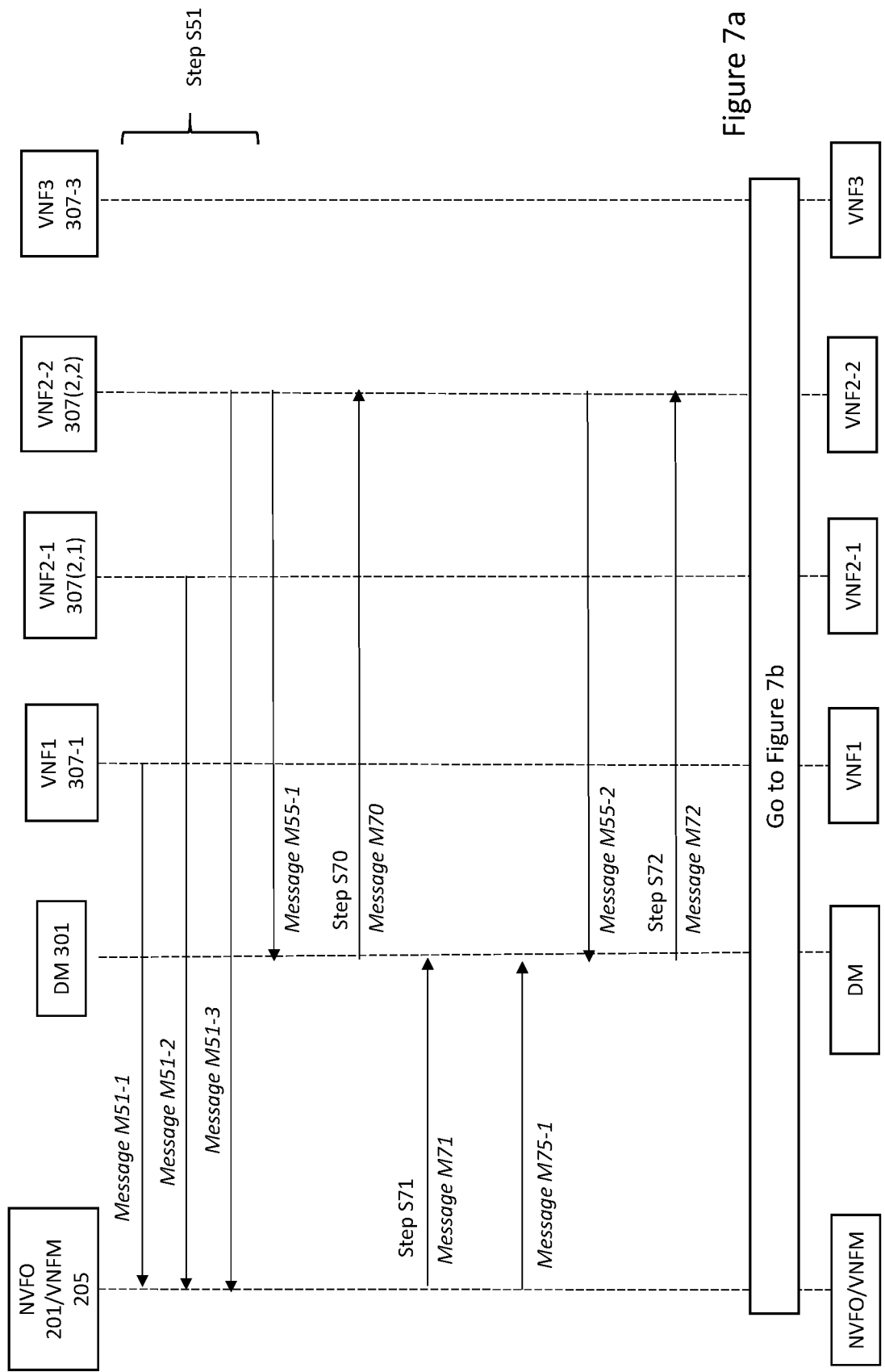

NETWORK FUNCTIONS VIRTUALIZATION

CROSS-REFERENCE TO RELATED APPLICATIONS

This application claims the benefit under 35 U.S.C. § 119(a) and 37 CFR § 1.55 to UK patent application no. 1806864.3, filed on Apr. 26, 2018 the entire content of which is incorporated herein by reference.

BACKGROUND OF THE INVENTION

Field of the Invention

Embodiments of the present disclosure relate to network functions virtualization and have particular, but not exclusive, application to lifecycle management of Virtualized Network Functions (VNFs).

Description of the Related Technology

Network functions virtualization (NFV), also known as virtual network function (VNF), offers a new way to design, deploy and manage networking services. NFV decouples network functions, such as network address translation (NAT), firewalling, intrusion detection, domain name service (DNS), and caching, from proprietary hardware appliances so they can run in software. NFV is designed to consolidate and deliver networking components needed to support a fully virtualized infrastructure—including virtual servers, storage, and other networks.

Referring to FIG. 1, NFV is a framework, which at a high level comprises the following three components:

NFV Infrastructure (NFVI) 101—the physical resources (compute, storage, network) and the virtual instantiations that make up the infrastructure.

Virtualized Network Functions (VNFs) 103—the software implementations of network functions.

NFV Management and Orchestration (NFV MANO) 105—the management and control layer that focuses on all the virtualization-specific management tasks required throughout the lifecycle of the VNFs.

Components 101, 103, 105 of NFV frameworks interoperate with one another in accordance with Group Specification GS NFV-MAN 001, defined by the European Telecommunications Standards Institute (ETSI). Referring to FIG. 2, GS NFV-MAN 001 specifies that the NFV MANO 105 component comprises an NVF orchestrator 201, which is responsible for, inter alia, on-boarding new network services and VNFs, and stores the necessary resources in the form of VNF deployment templates, VNF packages and descriptors of end-to-end network services in catalogues $203_1$, $203_2$.

NFV MANO 105 component also comprises one or more VNF Managers 205, which is/are responsible for lifecycle management of VNFs, in conjunction with the NVF orchestrator 201. Lifecycle management of a VNF includes instantiation (creating a VNF using the VNF on-boarding template); scaling of VNFs (increasing or reducing the capacity of a VNF); updating and/or upgrading VNFs (supporting VNF software and/or configuration changes of various complexity); and terminating VNFs (releasing VNF-associated NFV Infrastructure (NFVI) resources and returning to NFVI resource pool).

The VNF deployment templates, known as VNF Descriptors (VNFD), are stored in VNF catalogue $203_1$ and tell the VNF manager 205 how to construct the VNF, i.e., they identify Virtual Machine requirements, the order in which they are to be instantiated, required network connectivity, KPIs, scaling properties, etc. VNF packages, which are also stored in VNF catalogue $203_1$, comprise software images and manifest files, and specify the required functions for the VNF to operate. Network service descriptors are stored in NS catalogue $203_2$ and contain information about VNF forwarding graphs and associated descriptors, virtual links and associated descriptors, WAN connectivity aspects, Physical Network Function selection, and configuration scripts required for network service activation.

As noted above, VNFs 103 are software implementations of network functions, and need resources to run on: the NFVI 101 is the physical and virtual compute, storage and networking resources that VNFs utilize when executing according to the logic of their software. The NFV MANO 105 component comprises a Virtualized Infrastructure Manager (VIM) 207, which is responsible for provisioning and managing the virtual infrastructure NFVI 101. Put simply, the VIM 207 is the resource management component of the NFVI 101.

Also shown in FIG. 2 is an OSS/BSS component 209, which represents Operational and Business Support Systems and corresponds to a set of largely legacy functions that interoperate with the NFV framework. The NFV framework further includes an Element Manager (EM) component 211, which is responsible for fault, configuration, accounting, performance and security management. The various functional entities 101, 101, 201, 205, 207, 209, 211 communicate with each other in accordance with interfaces (Os-Manfvo, Or-Vnfm, Ve-Vnfm-em, Ve-Vnfm-nf, Vi-Vnfm, Nf-Vi, Or-Vi) specified in the afore-mentioned GS NFV-MAN 001 specification.

For all VNF lifecycle events, the VNF manager 205 triggers a sequence of events that causes the NFV orchestrator 201 to communicate with the VIM 207 in order to allocate, reserve and release resources of the NFVI 101 so that the VNF can subsequently execute its given network service.

It is common for the NFV MANO 105 components to be provided by a variety of suppliers (e.g. Cloudify™, Nokia™), for the NFVI 101 to be provided by another different set of suppliers (e.g. VMWare™, OpenStack™), and the VNFs—which provide customised network services—by others again. Typically, the implementation of a VNFM provided by one supplier will differ from that provided by another supplier. Since a given VNF Manager 205 is responsible for lifecycle management of VNFs (instantiation, scaling, healing etc. as noted above), then as regards any particular VNF, additional and different software has to be provisioned to each VNFM provider to enable a particular VNF Manager 205 to manage lifecycle events for that particular VNF. It would be desirable to reduce the level of customisation that is currently required by VNF Managers.

SUMMARY

According to a first aspect of the present disclosure, there is provided a method for managing virtual network functions (VNFs) in a communications network, the communications network comprising management and orchestration (MANO) entities and a deployment management entity which is functionally separate from the MANO entities, the MANO entities including:

a network function virtualization (NFV) orchestrator entity responsible for orchestrating one or more deployments of VNFs; and a VNF management entity responsible for management of VNFs, the method comprising, at the deployment management entity:

receiving a lifecycle management message relating to a deployment of VNFs;

associating the received lifecycle management message with a specific deployment of VNF instances, the specific deployment comprising a set of more than one VNF instances orchestrated by the network function virtualization (NFV) orchestrator and managed by the VNF management entity;

updating a first VNF instance in the deployment on the basis of the received lifecycle management message; and updating a second VNF instance in the deployment on the basis of the received lifecycle management message.

In one arrangement the lifecycle management message may comprise a management and orchestration (MANO) message, comprising data defining a deployment topology, from the VNF management entity. The first and second VNF instances can then be updated on the basis of the deployment topology. The MANO message may comprise a request to update a lifecycle state of the first VNF instance. Updating the first VNF instance may comprise transmitting data, relating to a change in lifecycle state of the first VNF instance, to the first VNF instance. Such a change may be notified via one or more deployment-specific parameters in e.g. a configuration message, whereby to configure the first VNF instance. These deployment-specific parameters may include IP addresses for the first VNF instance. Other updates relating to a change in lifecycle state of the first VNF instance may include quiesce instructions.

In other arrangements the lifecycle management message may comprise a lifecycle management message from the first VNF instance, such as a request to register the first VNF instance for a deployment-specific configuration.

In one arrangement, updating the second VNF instance comprises transmitting at the deployment management entity, an update message to the second VNF instance, the update message being indicative of a change in lifecycle state of the first VNF instance. For example, the update message may be indicative of the first VNF instance becoming available to the second VNF instance to cooperate in a service. In another examples the update message may be indicative of the first VNF instance no longer being available to the second VNF instance to cooperate in a service.

According to a further aspect of the present disclosure there is provided a system for managing virtual network functions (VNFs) in a communications network, the communications network comprising management and orchestration (MANO) entities and a deployment management entity which is functionally separate from the MANO entities, wherein:

the MANO entities include:

a network function virtualization (NFV) orchestrator entity responsible for orchestrating one or more deployments of VNFs; and a VNF management entity responsible for management of VNFs, and the deployment management entity includes:

a receive interface configured to receive a lifecycle management message relating to a deployment of VNFs;

a processing system configured to associate the received lifecycle management message with a specific deployment of VNF instances, the specific deployment comprising a set of more than one VNF instances orchestrated by the network function virtualization (NFV) orchestrator and managed by the VNF management entity; and a transmit interface configured to:

update a first VNF instance in the deployment on the basis of the received lifecycle management message; and update a second VNF instance in the deployment on the basis of the received lifecycle management message.

The lifecycle management message may comprise a management and orchestration (MANO) message from a VNF management entity. Each of the first and second VNF instances may be configured to register with the deployment management entity after receiving a network address of the deployment management entity from the VNF management entity. Further, each of the first and second VNF instances may be configured to transmit key performance indicators to the VNF management entity.

Further features and advantages described herein will become apparent from the following description of preferred embodiments, given by way of example only, which is made with reference to the accompanying drawings.

BRIEF DESCRIPTION OF THE DRAWINGS

FIGS. 7a and 7b collectively present a timing diagram showing a fourth lifecycle management process in accordance with an embodiment.

In the Figures and accompanying description, parts and steps common between different embodiments are identified by the same reference numerals.

DETAILED DESCRIPTION OF CERTAIN INVENTIVE EMBODIMENTS

Figure 1:
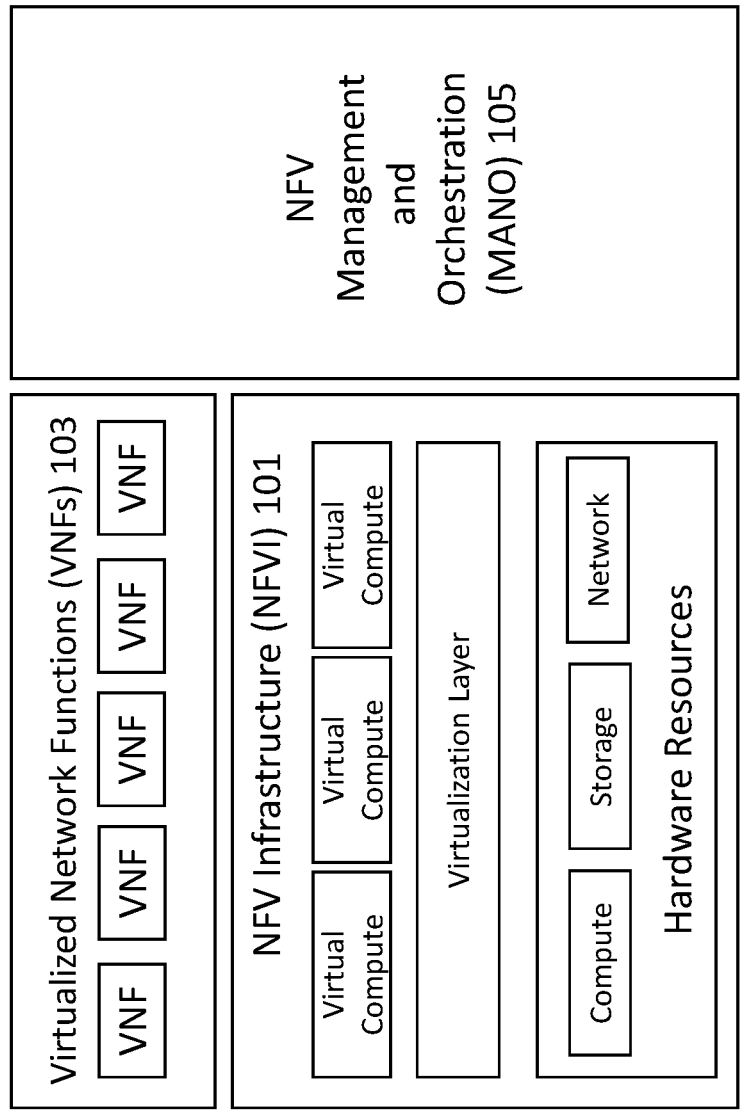
FIG. 1 is a schematic block diagram depicting components of a conventional network functions virtualization framework.
Figure 2:
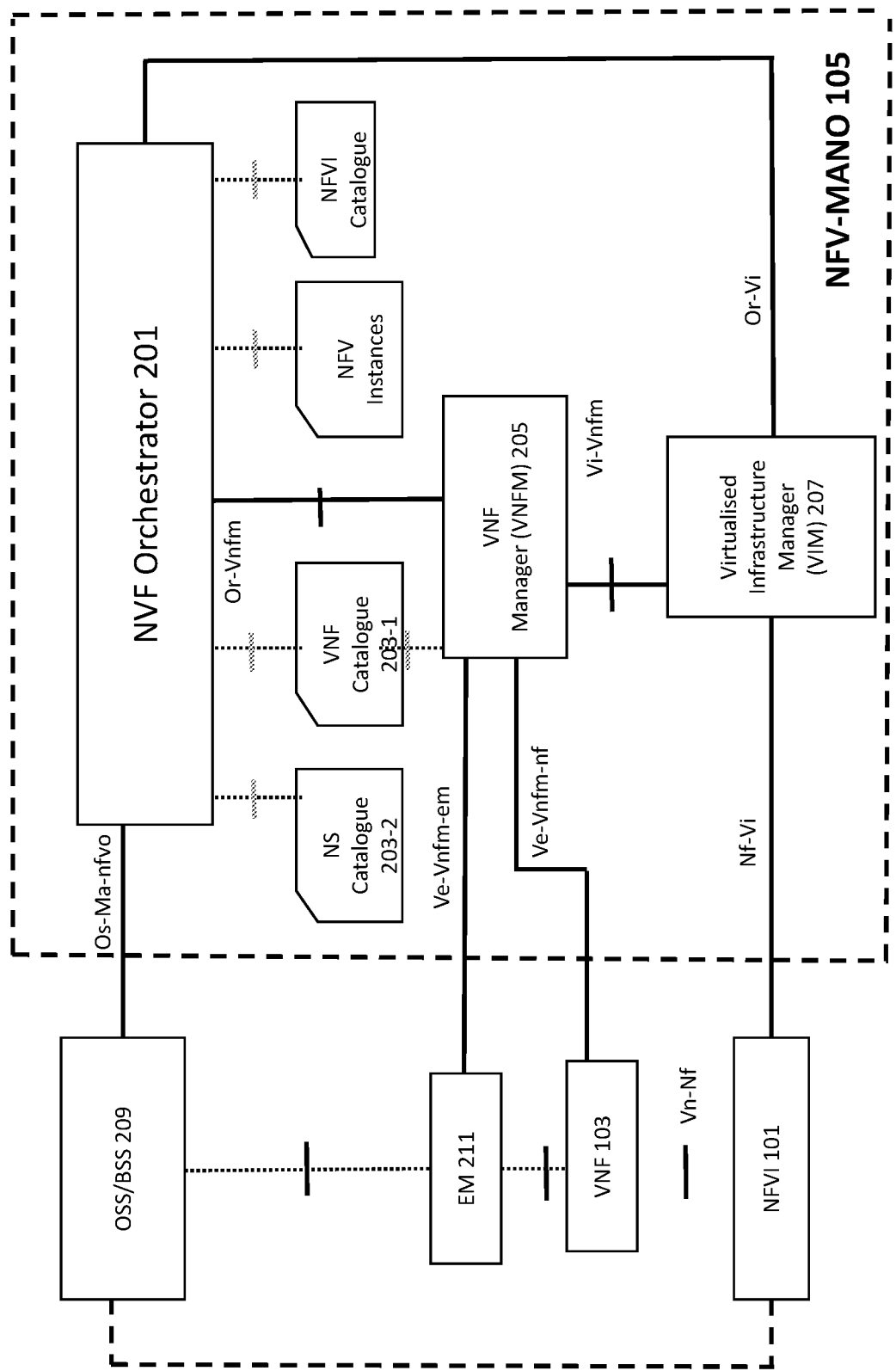
FIG. 2 is a schematic block diagram showing with greater specificity the components of FIG. 1.
Figure 3:
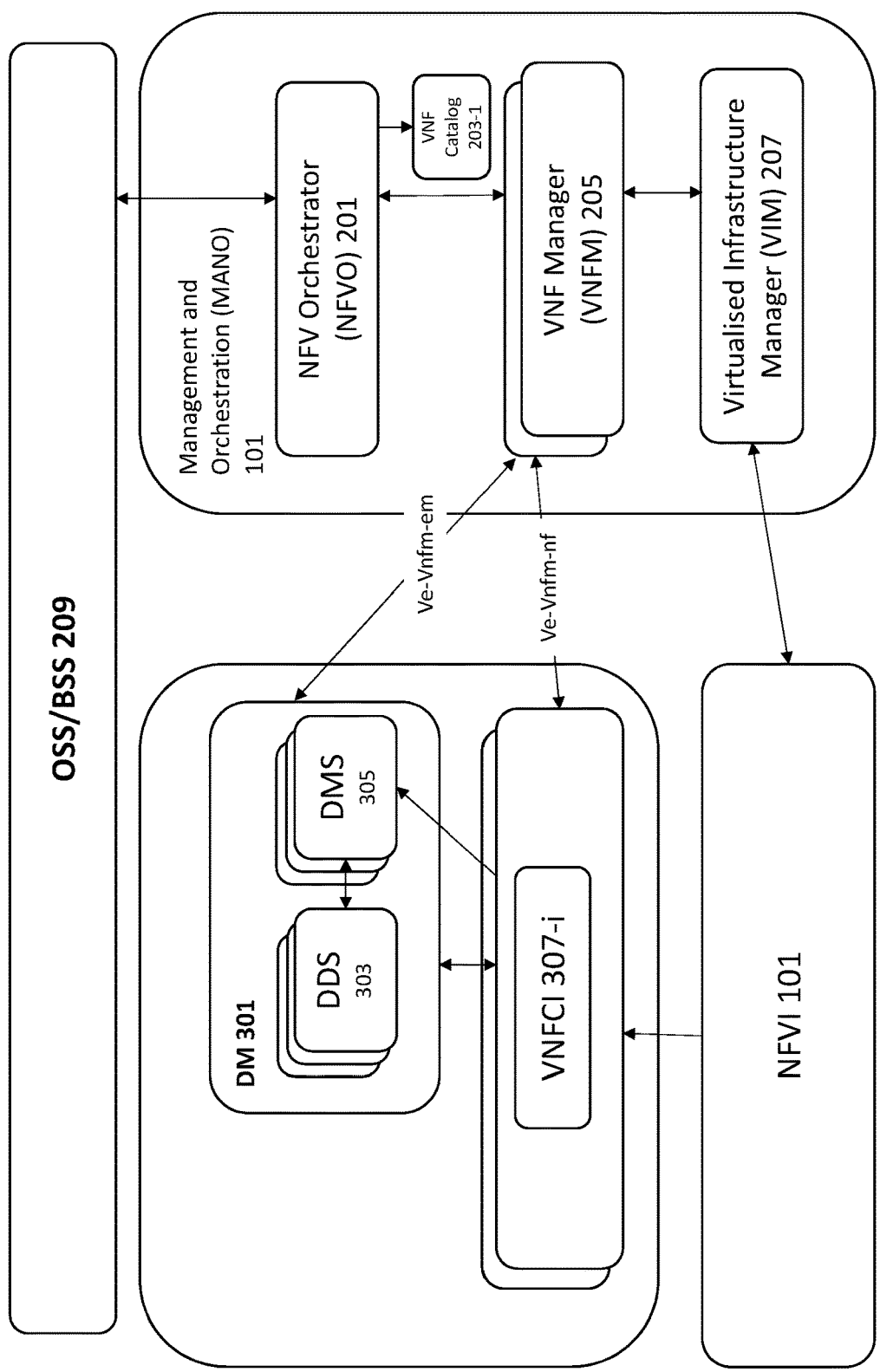
FIG. 3 is a schematic block diagram showing components of a network functions virtualization framework according to an embodiment.

Referring to FIG. 3, in addition to the standard components shown in FIGS. 1 and 2, embodiments described herein include a deployment management entity, also referred to herein as a Deployment Manager DM 301, which comprises a deployment database subsystem (DDS) 303 and a deployment manager subsystem (DMS) 305. The DDS 303 stores deployment configuration data that are dynamically generated and updated based upon lifecycle management messages, and the DMS 305 comprises computer programs in the form of stateless agents that, in one embodiment, implement and present a RESTful orchestration API to any given VNFM 205 (in accordance with the Ve-Vnfm-em interface). In such an implementation the DM 301 acts as an HTTPS server, with the VNFM 205 acting as an HTTPS client. In addition, the agents of the DMS 305 present interfaces to VNF instances 307, which enable VNF instances 307 to learn and apply deployment configuration information.

As will be evident from the examples presented below, the deployment manager DM 301 enables automation of VNF lifecycle events such as creation, scale out and scale in and healing. It also enables automatic configuration of deployment-wide settings such as time zone, Domain Name Server (DNS) and Network Time Protocol (NTP) server addresses and provides individual VNF instances with the means to discover other VNF instances in a given deployment by coordinating various multi-step, multi-element processes that will be described in more detail below.

Figure 4:
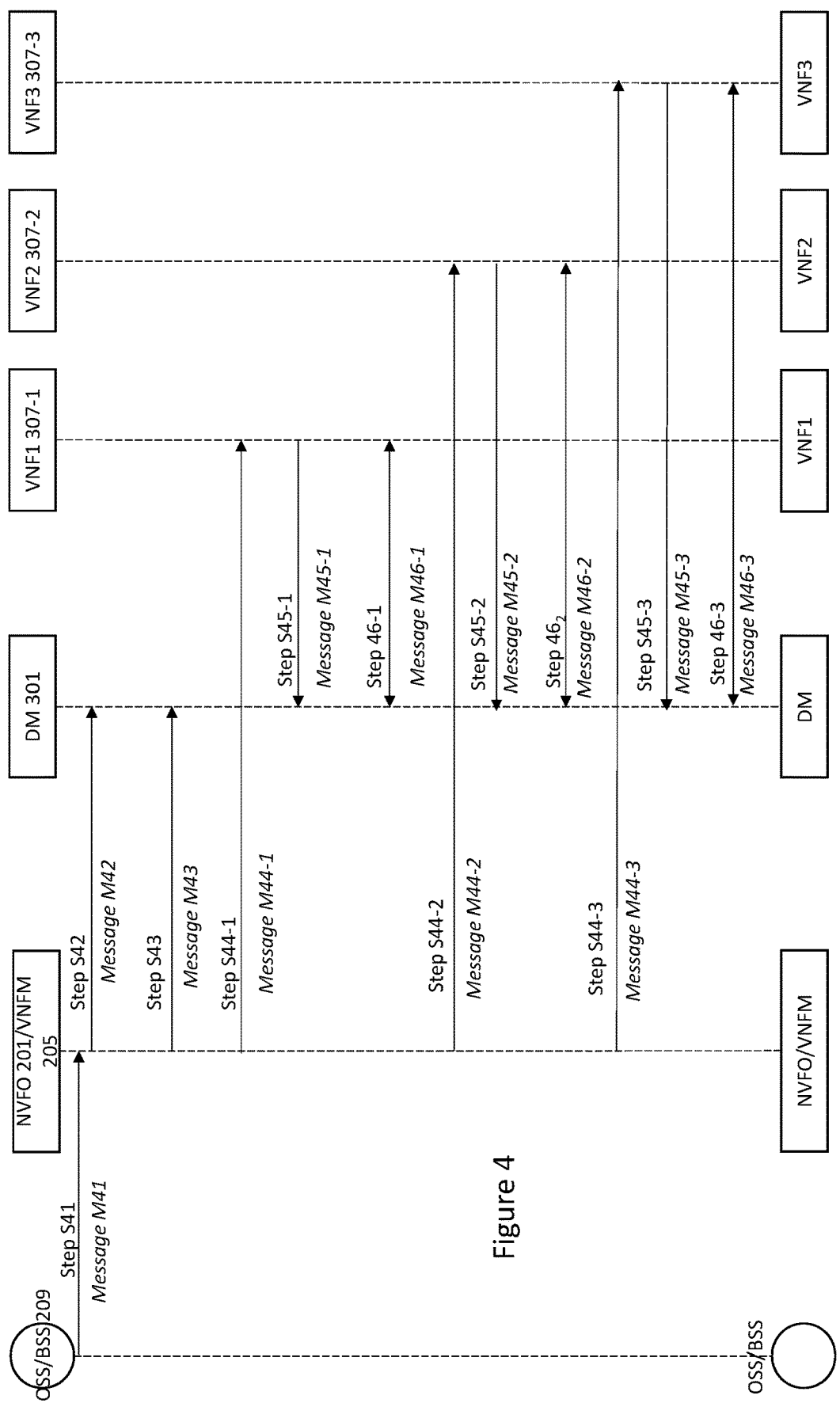
FIG. 4 is a timing diagram showing a first lifecycle management process in accordance with an embodiment.

FIG. 4 is a timing diagram showing a first example of a method of managing virtual network functions (VNFs) in a communications network according to an embodiment. The example depicted in FIG. 4 relates to deployment creation. The process starts with a deployment instruction message M41, received at step S41 from e.g. the OSS/BSS 209, which causes the VNFM 205 to instantiate the DM 301 (e.g. via message M42, at step S42) and to send a first lifecycle management message M43 relating to a deployment of VNFs to the DM 301 at step S43. The first lifecycle management message M43 comprises data identifying the VFNs, and interfaces therebetween, in this specific deployment. In response the DM 301 associates the first lifecycle management message M41 with a specific deployment of VNF instances, the specific deployment comprising a set of more than one VNF instances, which in this example is VNF instances $307_1$, $307_2$, $307_3$. For example, the DM 301 creates an entry in the DDS 303 for the specific deployment using a deployment ID, which may be a global namespace, and identifiers $307_1$, $307_2$, $307_3$ for the VNF instances in the specific deployment.

The VNFM 205 also sends an instantiation message $M44_1$ to a first VNF instance $307_1$ in the deployment at step $S44_1$, the instantiation message $M44_1$ comprising information that the first VNF instance $307_1$ needs in order to communicate with the DM 301. For example, the instantiation message $M44_1$ may comprise the IP address of the DM 301, a protocol version number, and security certificates needed by the first VNF instance $307_1$ so the first VNF instance $307_1$ can authenticate itself with the DM 301. The instantiation message $M44_1$ may be sent through OpenStack metadata or VMware VNF properties such that instantiation is possible without the first VNF instance $307_1$ being commissioned or even necessarily having IP configuration in place.

The DM 301 then receives a second lifecycle management message $M45_1$ from the first VNF instance $307_1$ at step $S45_1$, the second lifecycle management message $M45_1$ comprising VNF instance ID, group ID identifying the type of VNF and deployment ID. In response to receipt of the second lifecycle management message $M45_1$, the DM 301 identifies an entry in the DDS 303 having the same deployment ID (this having been initially created in response to receipt of the first lifecycle management message M43), and stores the afore-mentioned data in conjunction with the deployment ID.

At step $S46_1$, the DM 301 then proceeds to update the first VNF instance $307_1$ on the basis of the second lifecycle management message $M45_1$ by means of a configuration message $M46_1$, which contains data that the first VNF instance $307_1$ needs to 'locally' configure itself: e.g. one or some of its network configuration in the form of Network Time Protocol (NTP) information, Domain Name Server (DNS) information, Dynamic Host Configuration Protocol (DHCP) information or a dynamically assigned IP address for the first VNF instance $307_1$, which the DM 301 may allocate using a DHCP service prior to including in the configuration message $M46_1$. Optionally the configuration message $M46_1$ can include instructions informing the first VNF instance $307_1$ which role(s) it has, if, e.g. the software on the VNF could fulfil multiple roles. The configuration message $M46_1$ may also include platform-specific information such as the type of physical machine on which it will execute, and IP address(es) of a Service Discovery Service(s) local to the NVFO 201. In short, the information in the configuration message $M46_1$ serves to update a lifecycle state of the first VNF instance $307_1$ into a 'ready' state.

As shown in FIG. 4, steps $S44_1$-$S46_1$ are repeated for a second VNF instance $307_2$ in the deployment (denoted as steps $S44_2$, $S45_2$, $S46_2$) and for a third VNF instance $307_3$ (denoted as steps $S44_3$, $S45_3$, $S46_3$), and each VNF instance $307_2$ and $307_3$ is accordingly updated on the basis of the first lifecycle management message M43 received from the VNFM 205, containing the deployment information, at step S43. The skilled person will appreciate that while the example of FIG. 4 includes three VNF instances, the DM 301 can manage VNFs according to the foregoing for any number of VNFs.

Figure 5:
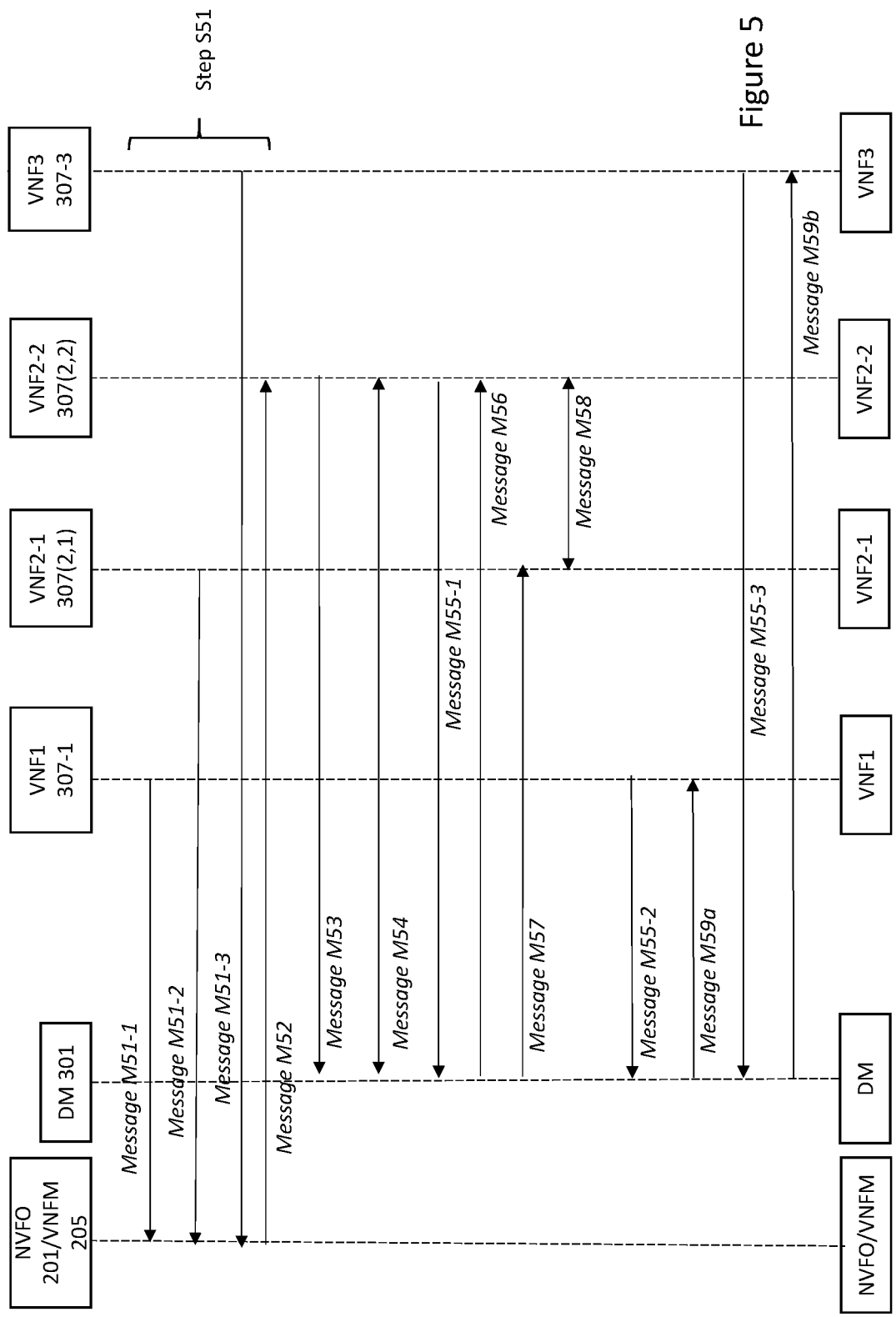
FIG. 5 is a timing diagram showing a second lifecycle management process in accordance with an embodiment.

FIG. 5 is a timing diagram showing a second example of a method of managing virtual network functions (VNFs) in a communications network according to an embodiment. The example depicted in FIG. 5 relates to so-called "scaling out" of VNF instances, in which a deployment of VNF instances is expanded in response to performance data that is reported to the VNFM 205 in the form of Key Performance Indicator (KPI) reporting messages ($M51_1$, $M51_2$, $M51_3$), shown collectively as step S51. In and of themselves and as regards the entity in the NFV framework to which they are communicated, these reporting messages are conventional.

In this example, KPI reporting message $M51_2$ sent by the second VNF $307_2$ contains performance data that exceeds a predefined threshold that is monitored and managed by the VNFM 205. In response the VNFM 205 determines that a second instance of second VNF $307_2$ is required in the deployment and sends an instantiation message M52 to a second instance of second VNF $307_{2\text{-}2}$. The contents of instantiation message M52 are in all material respects the same as those of the instantiation message $M44_1$ described above with reference to FIG. 4. Thereafter, the second instance of second VNF $307_{2\text{-}2}$ sends, and the DM 301 receives, a lifecycle management message M53, the parameters of which are in all material respects the same as those of the second lifecycle management message $M45_1$ described above with reference to FIG. 4, but whose content corresponds to details of the second instance of second VNF $307_{2\text{-}2}$. The DM 301 then updates the deployment data held by DDS 303 and proceeds to send a configuration message M54 to the second instance of second VNF $307_{2\text{-}2}$, which, as described above with reference to FIG. 4, contains data that the second instance of second VNF $307_{2\text{-}2}$ needs to 'locally' configure itself into the 'ready' state.

In this way the DM 301 is able to dynamically expand VNF capabilities based on the performance of the deployment, as monitored by the VNFM 205.

A particular benefit of embodiments disclosed herein will now be described, with continued reference to FIG. 5. Once a given VNF instance has been configured into the ready state, it can send polling messages to the DM 301, one of which is shown as polling message $M55_1$. These polling messages effectively serve to request a range of different status and deployment information, and in this embodiment the polling messages contain data requesting data relating to other VNF instances in the deployment. In response, the DM 301 queries the DDS 303 according to the following schema: VNF instance ID→VNF ID (group ID)→deployment ID. This enables the DM 301 to retrieve companion VNF instances, neighbouring VNFs and instances thereof that have been configured in the deployment.

In this example the DM 301 identifies that the second instance of second VNF $307_{2\text{-}2}$ is a companion VNF to the first instance of second VNF $307_{2\text{-}1}$, and that it should partner with the first instance of second VNF $307_{2\text{-}1}$ to satisfy the necessary performance requirements of this particular VNF service $307_2$. Thereafter, the DM 301 sends update messages M56, M57 to respective instances of the second VNF $307_{2\text{-}1}$, $307_{2\text{-}2}$, each update message containing sufficient information to enable the VNF instances $307_{2\text{-}1}$ and $307_{2\text{-}2}$ to cooperate in a service; this could be as little as the IP addresses of the leader, e.g. the first instance of second VNF $307_{2\text{-}1}$. In this example the respective instances of the second VNF $307_2$ cooperate by pooling, which proceeds, autonomously, between the VNF instances $307_{2\text{-}1}$ and $307_{2\text{-}2}$, as indicated by messages M58, and optionally in accordance with the content of the update messages M56, M57. For example, the update messages M56, M57 may include instructions as to which of the VNF instances $307_{2\text{-}1}$ and $307_{2\text{-}2}$ should lead in the pool.

FIG. 5 shows second and third polling messages, $M55_2$, $M55_3$, which are sent from the first and third VNFs $307_1$ and $307_3$ respectively. Again, in response to receipt of the polling messages, the DM 301 queries the DDS 303 according to the following schema: VNF instance ID→VNF ID (group ID)→deployment ID, and identifies that there has been a change to neighbour VNF $307_2$, namely that a second instance of the second VNF $307_2$ has been added to the deployment. In response to these polling messages $M55_2$, $M55_3$, the DM 301 sends update messages M59a, M59b to the first and third VNFs $307_1$, $307_3$, which contain e.g. the IP address of the newly added second instance of the second VNF $307_2$. Thereafter the instances of the first and third VNFs $307_1$, $307_3$ can autonomously interact with one of the first and second instances of second VNF $307_{2\text{-}1}$, $307_{2\text{-}2}$, depending on e.g. local load balancing rules configured in the respective first and third VNFs $307_1$, $307_3$. In short, neighbouring instances can learn about each other based upon the instance→group→deployment (topology) data held by the DDS 303.

Figure 6A:
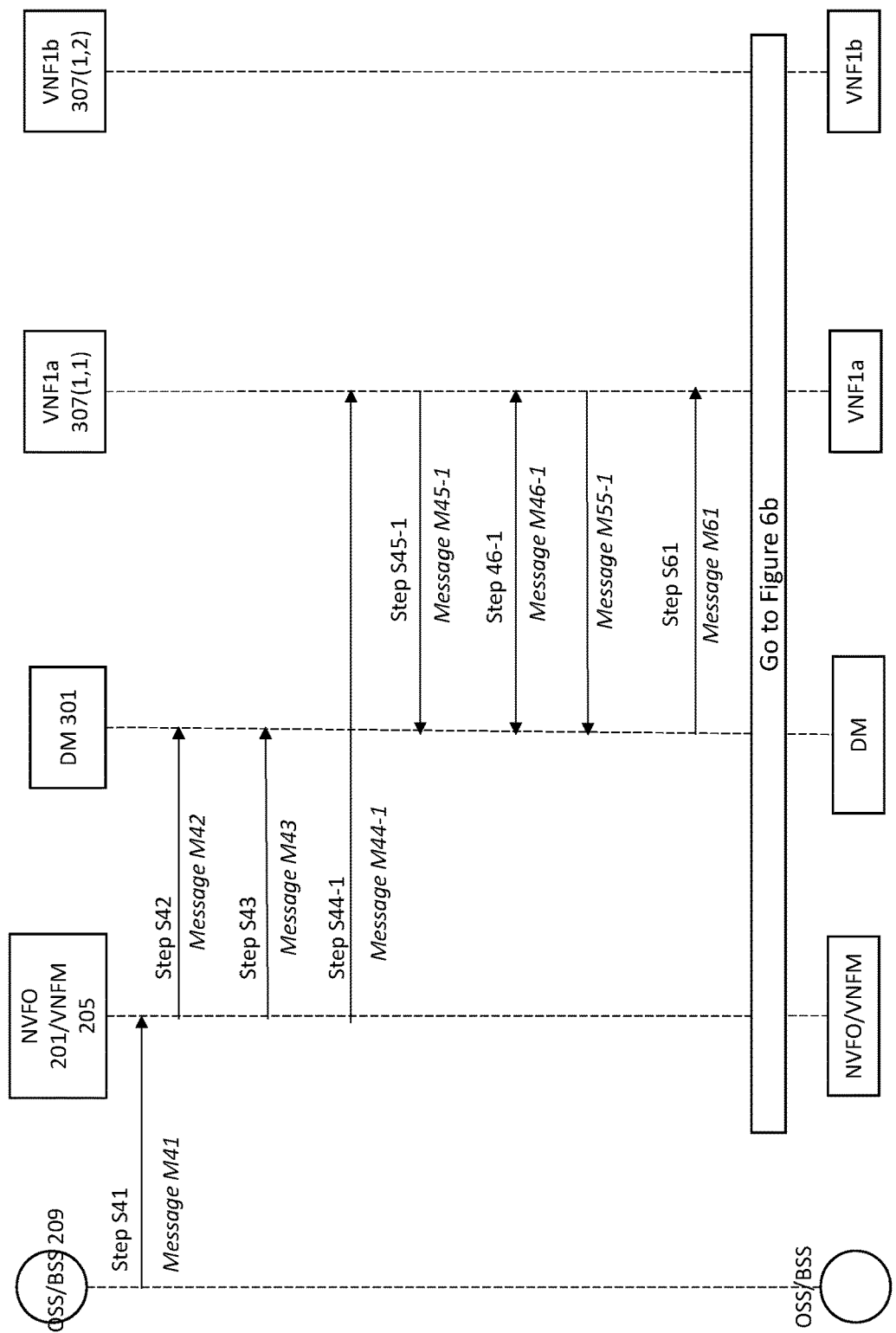
FIGS. 6a and 6b collectively present a timing diagram showing a third lifecycle management process in accordance with an embodiment.
Figure 6B:
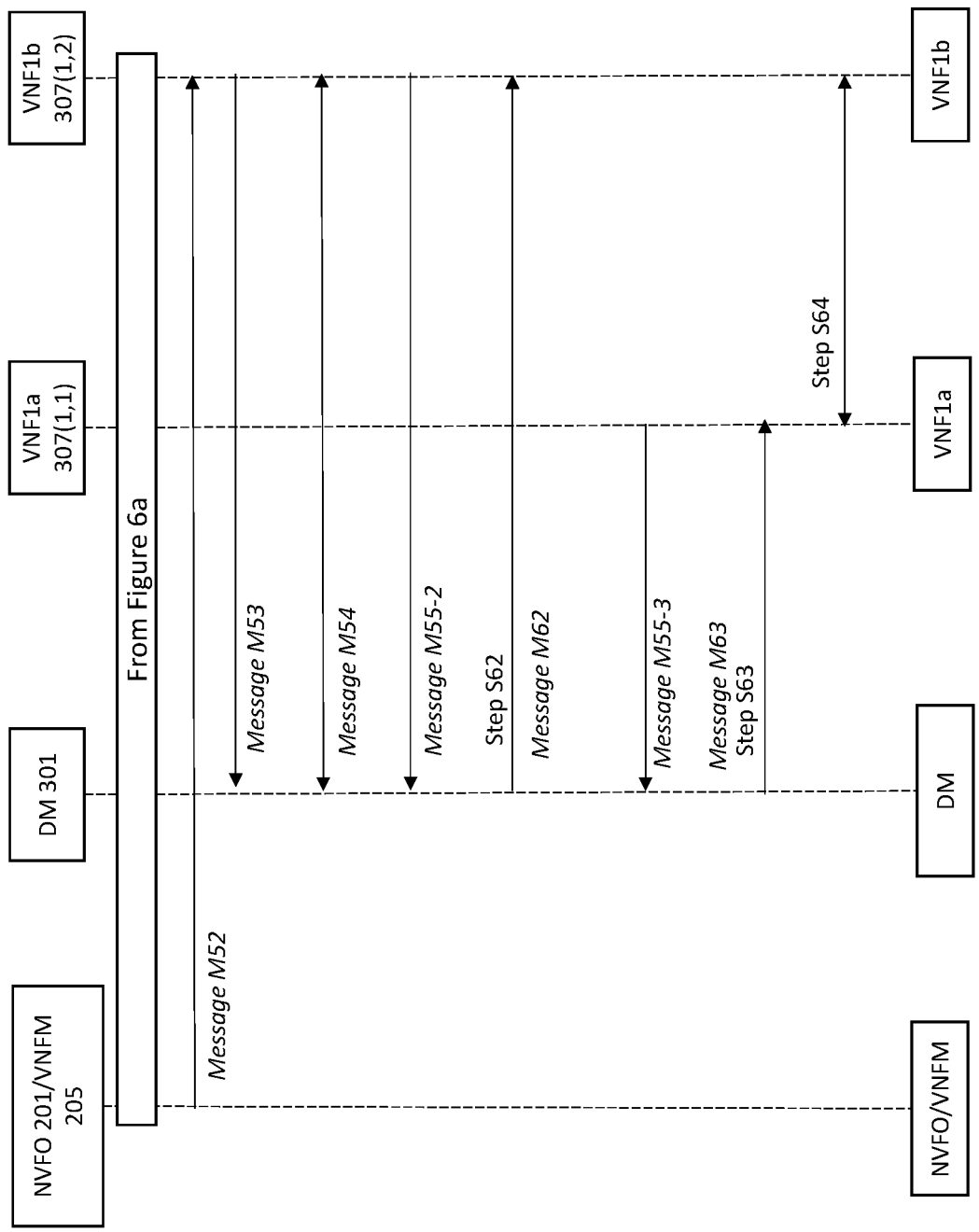

FIGS. 6a and 6b collectively present a timing diagram showing a third example of a method of managing virtual network functions (VNFs) in a communications network according to an embodiment. The example depicted in FIGS. 6a and 6b relates to partnering between instances of a given VNF. In this example, the deployment initially comprises only a first instance of a first VNF $307_1$, and initial lifecycle management and configuration of this first instance of the first VNF $307_1$ proceeds according to steps S41-$46_1$ as described in FIG. 4. Once the first instance of the first VNF $307_1$ $_{has}$ been configured (step $S46_1$), it sends a polling message $M55_1$ to the DM 301, which specifically queries the DM 301 for the existence of a partner, i.e. another instance of the first VNF $307_1$. Because the first instance of the first VNF $307_1$ is the only VNF instance in the deployment, the DM 301 responds with a negative response message M61 at step S61.

In one arrangement the VNFM 205 identifies that two instances of first VNF $307_1$ are required in a master slave relationship in the deployment, and may instantiate a second instance of the first VNF $307_1$ in parallel with initial lifecycle management and configuration of the first instance of the first VNF $307_1$. The VNFM 205 sends an instantiation message M52 to a second instance of first VNF $307_{1\text{-}2}$. The contents of instantiation message M52 are in all material respects the same as those of the instantiation message $M44_1$ described above with reference to FIG. 4. Thereafter, the second instance of first VNF $307_{1\text{-}2}$ sends, and the DM 301 receives, a lifecycle management message M53, the parameters of which are in all material respects the same as those of the second lifecycle management message $M45_1$ described above with reference to FIG. 4, but whose content corresponds to details of the second instance of first VNF $307_{1\text{-}2}$. The DM 301 then updates the deployment data held by DDS 303 and proceeds to send a configuration message M54 to the second instance of first VNF $307_{1\text{-}2}$, which, as described above with reference to FIG. 4, contains data that the second instance of first VNF $307_{1\text{-}2}$ needs to 'locally' configure itself.

Once configured, the second instance of first VNF $307_{1\text{-}2}$ sends a polling message $M55_2$ to the DM 301, which specifically queries the DM 301 for the existence of a partner, i.e. another instance of the first VNF $307_1$. Because there is another instance of the first VNF $307_1$ in the deployment, and one that is intended to form a partnered system with the first instance of first VNF $307_{1\text{-}1}$, the DM 301 responds at step S62 with an update message M62, which contains sufficient information to enable the second instance of first VNF $307_{1\text{-}2}$ to partner with the first instance of first VNF $307_{1\text{-}1}$; for example, this could be the IP address of the first instance of first VNF $307_{1\text{-}1}$ and may include instructions informing the second instance of first VNF $307_{1\text{-}2}$ that it is to be the slave in the partnership.

In the meantime, a preconfigured polling interval has passed since the first instance of first VNF $307_{1\text{-}1}$ received a negative response message M61 in response to its polling message $M55_1$. The first instance of first VNF $307_{1\text{-}1}$ sends a further polling message $M55_3$, which is in all senses identical to polling message $M55_1$. However, because there is now another instance of the first VNF $307_1$ in the deployment, at step S63 the DM 301 responds with an update message M63, which contains sufficient information to enable the first instance of first VNF $307_{1\text{-}1}$ to partner with the second instance of first VNF $307_{1\text{-}2}$ (step S64); for example, this could be the IP address of the second instance of first VNF $307_{1\text{-}2}$ and may include instructions informing the first instance of first VNF $307_{1\text{-}1}$ that it is to be the master in the partnership.

In arrangements in which the VNFM 205 identifies the need for two VNF instances $307_{1\text{-}1}$ and $307_{1\text{-}2}$ it may create both at the same time. However, different start-up speeds might mean that one VNF instance $307_{1\text{-}1}$ is ready before the other VNF instance $307_{1\text{-}2}$ meaning that the first VNF instance $307_{1\text{-}1}$ will need to wait for the other VNF instance $307_{1\text{-}2}$ to announce itself to DM 301 via lifecycle management message M53. The polling messages $M55_1$ provide a convenient mechanism for later starting VNF instances (in this example VNF instance $307_{1\text{-}2}$) to be notified to earlier starting VNF instances (in this example VNF instance $307_{1\text{-}1}$).

As an alternative to identifying that a partnered system is required, the VNFM 205 may identify that a plurality of first VNF $307_1$ are required in a cluster relationship in the deployment. Clustered systems differ from the afore-described partnered systems in that partnered systems are typically tightly coupled, while clustered systems are more loosely coupled. Further, if a clustered system is stateful, then in general a minimum of three VNF instances are required to ensure data resilience and consistency. In short, there is no specific master-slave relationship and, in certain arrangements, individual VNF instances can operate to provide a service without knowledge of other VNF instances in the cluster. Accordingly, to the extent the DM 301 provides information about other VNF instances in the clustered system, an update message, sent to an instance of a VNF instance polling for the existence of other VNF instances, notifies the location and/or identity of other VNF instances and will not include any instructions as regards specific mode of operation or hierarchy therebetween.

It is to be appreciated that in addition, or as an alternative, to the VNFM identifying that a clustered system is required as part of initial deployment, a clustered system may be created as part of scaling out of a single VNFM instance in response to a KPI reporting message—e.g. by adding two further VNFM instances. Furthermore, an existing clustered system can be expanded by scaling out an existing VNFM deployment, for which the relevant steps have been described above with reference to FIG. 5, and involve the sending of update messages by the DM 301 that provide the location and/or identity of newly added VNF instances.

By contrast, scaling out of an existing partnered system may require the addition of further partnered VNF instances. In this situation the VNFM 205 may send two instantiation messages (not shown, but the equivalent of message M44$_1$ shown in FIG. 4) to two VNF instances (not shown), causing the two VNF instances to each transmit lifecycle management messages (not shown, but the equivalent of message M45$_1$ shown in FIG. 4) to the DM 301 so that the deployment data held by the DDS 303 can be updated accordingly. These and the VNF instances of the existing partnered system learn about each other via the polling messages, as described with reference to FIG. 5, and are configured as master and slave in dependence upon instructions in the update messages that are sent in response to polling messages received by the DM 301. In short, once a new partnership is formed, it can learn about the existence of existing partnership(s) and has the opportunity to establish a cluster if appropriate for the VNF type, or to just run in parallel if the VNF does not support clustering of partnerships.

It will be appreciated from the foregoing that the lifecycle management processes described with reference to FIGS. 4-6 enable VNF instances to receive basic bootstrap information about their identity and thereafter can automatically learn everything else that is needed to participate in a specific deployment. For example, a given VNF instance could use DHCP to find its IP address and contact the DM 301 to "add itself" to a pool of identical VNFs to start receiving data.

Furthermore, network services can be constructed by any given combination of VNF Managers without needing to know how individual VNF instances are configured within a VNF group, which is useful for scaling and where the VNF instances might move around dynamically, based on customer requirements.

Figure 7B:
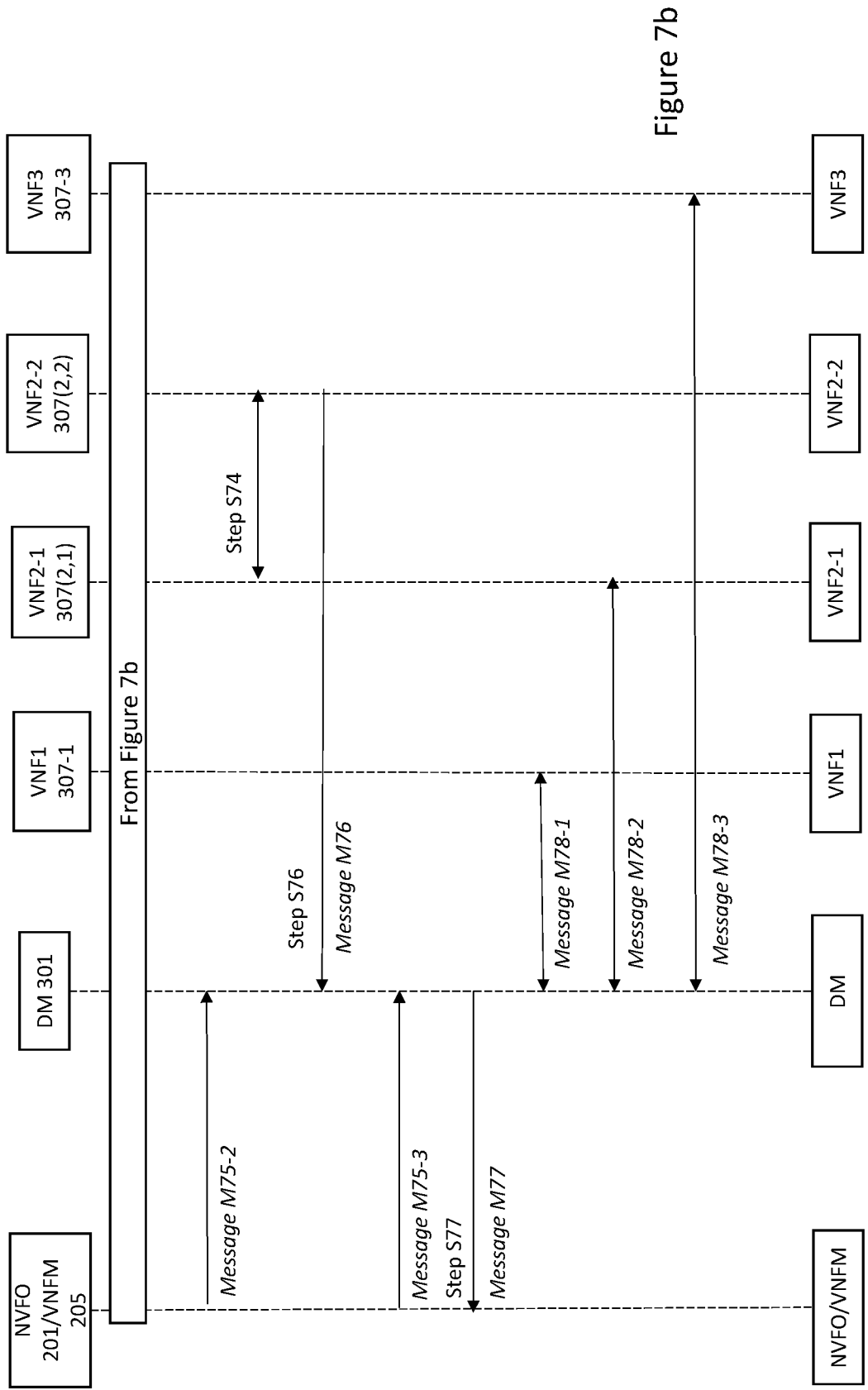

FIGS. 7a and 7b collectively present a timing diagram showing a fourth example of a method of managing virtual network functions (VNFs) in a communications network according to an embodiment. The example depicted in FIGS. 7a and 7b relates to so-called "scaling in" of VNF instances, in which a deployment of VNF instances is contracted in response to performance data that is reported to the VNFM 205 in the form of KPI reporting messages (M51$_1$, M51$_2$, M51$_3$), shown collectively as step S51. As for the FIG. 5 embodiment, in and of themselves and as regards the entity in the NFV framework to which they are communicated, these KPI reporting messages are conventional.

In this example, KPI reporting message M51$_3$ sent by the second instance of second VNF 307$_{2-2}$ contains performance data that falls below a predefined threshold that is monitored and managed by the VNFM 205. In response the VNFM 205 determines that the deployment should be contracted and sends a lifecycle management message M71 at step S71 indicating that the second instance of second VNF 307$_{2-2}$ should be quiesced. In response to receipt of this lifecycle management message M71, the DM 301 updates the deployment data held by the DDS 303 for the second instance of second VNF 307$_{2-2}$, in particular lifecycle state information for the second instance of second VNF 307$_{2-2}$.

As described above, the various VNF instances currently in the deployment independently send polling messages to the DM 301. These polling messages effectively serve to request a range of different status and deployment information, and in this embodiment the polling messages of interest contain data requesting instructions as to the desired state of the querying VNF instance. FIGS. 7a and 7b only show such polling messages M55$_1$, M55$_2$ from the second instance of second VNF 307$_{2-2}$, but it is to be understood that others of the VNF instances may similarly send such polling messages in accordance with internally maintained polling intervals.

Prior to receipt of the lifecycle management message M71 setting the state of the second instance of second VNF 307$_{2-2}$ to "quiesce", and in response to the first polling message M55$_1$, at step S70 the DM 301 sends a response message M70 to update the second instance of second VNF 307$_{2-2}$ with lifecycle state "running", which is to say that the update is to maintain the current lifecycle state of the second instance of second VNF 307$_{2-2}$. After the polling interval for the second instance of second VNF 307$_{2-2}$ has expired, the second instance of second VNF 307$_{2-2}$ sends a second polling message M55$_2$. Because the DM 301 has in the meantime been notified by the VNFM 205 that the second instance of second VNF 307$_{2-2}$ is to be quiesced, the DM 301 responds at step S72 with update message M72, specifying that the second instance of second VNF 307$_{2-2}$ is to be set to lifecycle state "quiesced".

FIGS. 7a and 7b also show a series of polling messages M75$_1$, M75$_2$, M75$_3$ from the VNFM 205 to the DM 301 requesting the current lifecycle state of the second instance of second VNF 307$_{2-2}$. These polling messages M75$_1$, M75$_2$, M75$_3$ serve to notify the VNFM 205 as early as possible that the second instance of second VNF 307$_{2-2}$ has been gracefully terminated, and thereby enable the VNFM 205 to free up the virtual resources previously assigned for this second instance of second VNF 307$_{2-2}$.

Meanwhile the second instance of second VNF 307$_{2-2}$ responds to the lifecycle state "quiesced" contained within update message M72 by executing the necessary software routines local to the second instance of second VNF 307$_{2-2}$ in order to effect the same. In this example the second instance of second VNF 307$_{2-2}$ had pooled with the first instance of second VNF 307$_{1-2}$ as described with reference to FIG. 5, and accordingly execution of the mentioned software routines includes de-pooling (step S74) with the first instance of second VNF 307$_{1-2}$. As described with reference to the pooling process, the second instance of second VNF 3072$_{2-2}$ is able to effect de-pooling autonomously because it has previously been configured with e.g. the IP address and other necessary configuration information relating to the first instance of second VNF 307$_{1-2}$. The final step performed by the second instance of second VNF 307$_{2-2}$ is to notify the DM 301 of its current lifecycle state "quiesced" via lifecycle state message M76 at step S76, whereupon the DM 301 updates the deployment data held by DDS 303 so that when a next poll message M75$_3$ is received from the VNFM 205, the DM 301 can respond with lifecycle state message M77 "not running" at step S77 for the second instance of second VNF 3072$_{2-2}$ and thereby enable the VNFM 205 to free up the associated virtual resources, as noted above.

In addition, the DM 301 updates the first VNF 307$_1$, the first instance of second VNF 307$_{2-1}$ and the third VNF 307$_3$ that the lifecycle state of the second instance of second VNF 3072$_{2-2}$ has changed via update messages M78$_1$, M78$_2$, M78$_3$, e.g. by notifying these VNF instances that the second instance of second VNF 307$_{2-2}$ has been removed from the deployment and is no longer able to cooperate in a service. Alternatively the DM 301 can inform the other VNFs as soon as the second instance of second VNF 3072$_{2-2}$ is set to "should quiesce" (via message M71); this allows the other VNFs to stop load-balancing to the second instance of second VNF 3072$_{2-2}$ or (at a minimum) to expect the second instance of second VNF 3072$_{2-2}$ to shortly become inoperative.

Non-Limiting Additional Implementation Details

The DM 301 may be embodied as a collection of containerized microservices, pre-packaged into virtual machines comprising a plurality of instances to provide redundancy, and to retain quorum in the event a single instance fails.

In order to mitigate possible security risks, all network traffic between the components of the DM 301 and the VNF instances may use mutual Transport Layer Security (TLS), e.g. using TLS certificates from HashiCorp's Vault Service. This protects against snooping and allows both ends of the connection to determine that the other end can be trusted. The NVF orchestrator 201 may provide each component of the DM 301 with a Vault access token as part of initial configuration, which is used to connect to Vault in order to generate TLS certificates, as well as periodically to renew the Vault access token.

Although at least some aspects of the embodiments described herein with reference to the drawings comprise computer processes e.g. in the form of agents executed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, while update, response and configuration messages in the examples described herein are sent by the DM 301 to VNF instances it is contemplated that these messages could alternatively be sent to an Element Manager (EM) responsible for managing a particular VNF.

Further, while the examples described above involve VNF instances sending a second lifecycle message M45$_1$, M53 to the DM 301 in response to receipt of instantiation message M44$_1$, M52 received from the VNFM 205 in order to trigger configuration of the VNF instance, the DM 301 could alternatively be configured to "push" a configuration message M46$_1$, M54 to a given VNF instance, for example in response to the first lifecycle message M43. In such alternatives one of the afore-mentioned polling messages could be purposed for the given VNF instance to authenticate with the DM 301 and send its VNF instance ID, group ID identifying the type of VNF and deployment ID.

Furthermore, while the above embodiments describe the first lifecycle management message M43 emanating from VNFM 205, this message M43 may be sent from the NVFO 201 or a logical combination of the NVFO 201 and the VNFM 205, as is indicated in the Figures.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A non-transitory computer readable storage medium storing instructions that, when executed by a processor, cause the processor to perform a method for managing virtual network functions (VNFs) in a communications network, the communications network comprising a management and orchestration (MANO) component comprising MANO entities, the MANO entities including a network function virtualization (NFV) orchestrator entity responsible for orchestrating one or more deployments of VNFs and a VNF management entity responsible for management of VNFs, the method comprising, at a deployment management entity which (i) is not comprised in the MANO component, (ii) is functionally separate from the MANO entities, and (iii) has an interface with the VNF management entity:

receiving, from the VNF management entity, over the interface between the deployment management entity and the VNF management entity, a lifecycle management message relating to lifecycle management of a deployment of VNFs;

associating the received lifecycle management message with a specific deployment of VNF instances, the specific deployment comprising a set of more than one VNF instances orchestrated by the NFV orchestrator and managed by the VNF management entity;

updating a first VNF instance in the deployment on the basis of the received lifecycle management message; and updating a second VNF instance in the deployment on the basis of the received lifecycle management message, wherein updating the second VNF instance comprises transmitting, at the deployment management entity, an update message to the second VNF instance, the update message being indicative of a change in lifecycle state of the first VNF instance.

2. The non-transitory computer readable storage medium of claim 1, wherein the lifecycle management message comprises a management and orchestration (MANO) message from the VNF management entity, wherein the MANO message comprises data defining a deployment topology, and wherein the method comprises updating the first and second VNF instances on the basis of the deployment topology.

3. The non-transitory computer readable storage medium of claim 1, wherein the lifecycle management message comprises a management and orchestration (MANO) message from the VNF management entity, and wherein the MANO message comprises a request to update a lifecycle state of the first VNF instance.

4. The non-transitory computer readable storage medium of claim 1, the method comprising receiving a lifecycle management message from the first VNF instance.

5. The non-transitory computer readable storage medium of claim 4, wherein the lifecycle management message received from the first VNF instance comprises a request to register the first VNF instance for deployment-specific configuration.

6. The non-transitory computer readable storage medium of claim 1, wherein updating the first VNF instance comprises, at the deployment management entity, transmitting data, relating to a change in lifecycle state of the first VNF instance, to the first VNF instance.

7. The non-transitory computer readable storage medium of claim 6, wherein the data relating to a change in lifecycle state of the first VNF instance comprises one or more deployment-specific parameters to configure the first VNF instance.

8. The non-transitory computer readable storage medium of claim 7, wherein the method comprises, at the deployment management entity, allocating an IP address to the first VNF instance, and including the allocated IP address in the one or more deployment-specific parameters.

9. The non-transitory computer readable storage medium of claim 1, wherein the update message is indicative of the first VNF instance becoming available to the second VNF instance to cooperate in a service.

10. The non-transitory computer readable storage medium of claim 1, wherein the update message is indicative of the first VNF instance no longer being available to the second VNF instance to cooperate in a service.

11. The non-transitory computer readable storage medium of claim 1, wherein the interface between the deployment management entity and the VNF management entity comprises a Ve-Vnfm-em interface.

12. A non-transitory computer readable storage medium storing instructions that, when executed by a processor, cause the processor to manage virtual network functions (VNFs) in a communications network, the communications network comprising a management and orchestration (MANO) component comprising MANO entities, the MANO entities including a network function virtualization (NFV) orchestrator entity responsible for orchestrating one or more deployments of VNFs and a VNF management entity responsible for management of VNFs, wherein the communications network further comprises a deployment management entity which (i) is not comprised in the MANO component, (ii) is functionally separate from the MANO entities, and (iii) has an interface with the VNF management entity, wherein the deployment management entity includes:

a receive interface configured to receive, from the VNF management entity, a lifecycle management message relating to lifecycle management of a deployment of VNFs;

a processing system configured to associate the received lifecycle management message with a specific deployment of VNF instances, the specific deployment comprising a set of more than one VNF instances orchestrated by the NFV orchestrator and managed by the VNF management entity; and a transmit interface configured to:
update a first VNF instance in the deployment on the basis of the received lifecycle management message; and update a second VNF instance in the deployment on the basis of the received lifecycle management message, wherein updating the second VNF instance comprises transmitting, at the deployment management entity, an update message to the second VNF instance, the update message being indicative of a change in lifecycle state of the first VNF instance.

13. The non-transitory computer readable storage medium of claim 12, wherein the communication network further comprises the first VNF instance and the second VNF instance, wherein each of the first and second VNF instances are configured to register with the deployment management entity after receiving a network address of the deployment management entity from the VNF management entity.

14. The non-transitory computer readable storage medium of claim 13, wherein each of the first and second VNF instances are configured to transmit key performance indicators to the VNF management entity.

* * * * *